United States Patent [19]

Kubota et al.

[11] 4,415,630

[45] Nov. 15, 1983

[54] PROCESS OF MAKING MAGNETIC RECORDING MEDIUM

[75] Inventors: Yuichi Kubota; Masaharu Nishimatsu; Kazushi Tanaka, all of Tokyo, Japan

[73] Assignee: TDK Electronics Co., Ltd., Tokyo, Japan

[21] Appl. No.: 470,180

[22] Filed: Feb. 28, 1983

Related U.S. Application Data

[63] Continuation of Ser. No. 269,391, Jun. 1, 1981, abandoned.

[30] Foreign Application Priority Data

Jun. 10, 1980 [JP] Japan .................... 55-78223
Jun. 10, 1980 [JP] Japan .................... 55-78227

[51] Int. Cl.³ .................... B32B 5/16; H01F 10/02
[52] U.S. Cl. .................... 428/403; 427/44; 427/127; 427/128; 427/216; 427/221; 427/385.5; 427/388.1; 428/457; 428/500; 428/522; 428/694; 428/900
[58] Field of Search .................... 427/44, 127, 128, 216, 427/221, 385.5, 388.1; 428/403, 457, 500, 522, 694, 900

Primary Examiner—Bernard D. Pianalto

Attorney, Agent, or Firm—Wyatt, Gerber, Shoup, Scobey & Badie

[57] ABSTRACT

A magnetic recording medium comprises a substrate and a magnetic recording layer formed thereon and which is made of a magnetic coating material consisting essentially of a magnetic powder dispersed in a binder, the coating material containing a titanium coupling agent. The magnetic powder is coated with the coupling agent or is mixed with the agent and then dispersed in the binder. The binder is prepared by mixing and plasticizing a radiation-sensitive modified resin with a radiation-sensitive soft resin and subjecting the mixture to radiation cross-linking and polymerization. Process for producing the medium comprises coating the magnetic particles with the titanium coupling agent, blending the coated particles with the binder to form a magnetic coating material, and then applying the material to the substrate. Alternatively, the process comprises mixing the titanium coupling agent with the magnetic particles, blending the mixture with the binder, and then applying the resulting coating material to the substrate. The titanium coupling agent is used in an amount of 0.5-7 wt %, preferably 0.5-3 wt %, based on the weight of the magnetic powder.

11 Claims, 5 Drawing Figures

PROCESS OF MAKING MAGNETIC RECORDING MEDIUM

This is a continuation of application Ser. No. 269,391 filed June 1, 1981, abandoned.

BACKGROUND OF THE INVENTION

This invention relates to improvements in a magnetic recording medium for use in the form of a video tape, computer tape, high performance sound recording tape, multicoat tape, magnetic disk, floppy disk, magnetic card, or the like.

Magnetic recording materials for those applications generally use a thermosetting binder, and a three-dimensional network structure is formed by a chemical reaction of a cross-linking agent, such as a polyisocyanate-radical-containing compound, with reactive functional groups, such as hydroxyl, amino, or the like, in the binder. The formation of the structure is intended to prevent the magnetic recording layer from coming off and to improve the durability, running properties, and environmental reliability of those magnetic media. Also, the conventional media employ a silane coupling agent for the purpose of organic or inorganic complexing or compounding. With a coupling agent of the kind, however, it is still impossible to obtain satisfactory dispersion of an inorganic solid powder in magnetic pigments which contain such ferromagnetic metals as Fe, Co, and Ni. As a consequence, the bonds between the magnetic material and the binder and between the magnetic recording layer and the substrate are insufficient and weak, causing a progressive and rapidly intensified tendency of dropouts from the both edges inwardly of the tape as it runs past the record or play head.

BRIEF SUMMARY OF THE INVENTION

This invention has for its object the provision of a magnetic recording medium improved in surface properties to such an extent that it can overcome the afore-described difficulties.

The magnetic recording medium according to the invention uses a titanium coupling agent for the coupling purpose, as mixed with magnetic particles, a binder, and also other additives, such as an antistatic agent, lubricant, and organic solvent, so as to improve the wear resistance and decrease the friction of the medium with respect to head recorder systems.

The titanium coupling agent that the present invention adopts features six different functions as will be expected from its molecular structure. With a chemical structure

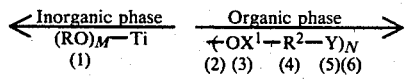

it is polyfunctional in contrast to the silane coupling agent and attains a new, modifying coupling effect.

Function (1): $(RO)_M$—Chemically combines with an inorganic substance.

Function (2): —(—Undergoes transesterification, bridging, and hardening.

Function (3): $OX^1$—This group combines with titanium as a nuclei and influences all other functions.

Function (4): $R^2$—A group for inducing molecular entanglement in a long chain; it exhibits a behavior like a plastic polymer.

Function (5): Y—Reactive and bridges and hardens, behaving like a thermosetting polymer.

Function (6): N—Polyfunctional and behaves like thermoplastic and thermosetting polymers.

These characteristic functions are extremely useful in improving the adhesion of the magnetic layer to the base, fluidity and hence coatability of the magnetic coating on account of the plastic behavior, wear resistance with strengthened bond between the magnetic powder and the binder, and dispersibility of the magnetic particles; in economizing in the solvent thanks to the higher solids content of the coating composition; and in preventing the dropouts of the magnetic recording layer with repeated usage. With these and other advantages the titanium coupling agent makes it possible to obtain an ideal magnetic recording medium. The agent is used in an amount ranging from 0.5 to 7% by weight, preferably from 0.5 to 3% by weight, based on the weight of the magnetic powder.

DETAILED DESCRIPTION OF THE INVENTION

Figure 1:
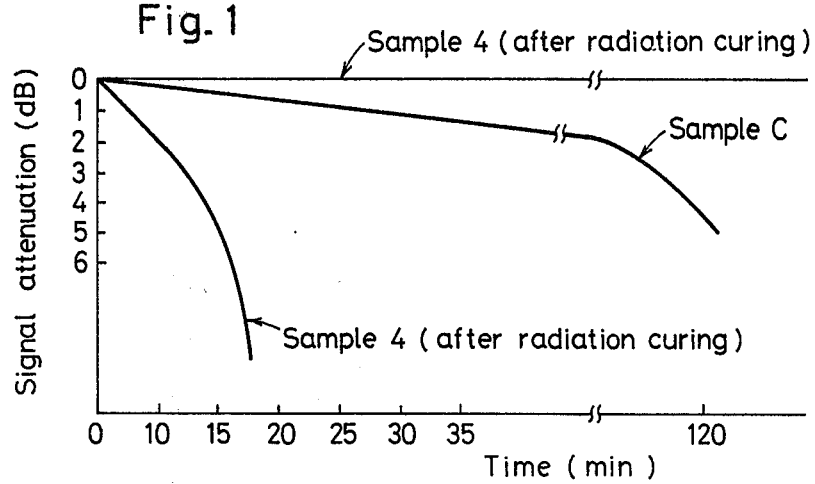
FIG. 1 is a graph showing rates of signal attenuation with time.

The invention is illustrated by the following examples. Examples 1 and 2 describe the procedures in which a magnetic powder is first wetted with a coupling agent and then mixed with a binder.

EXAMPLE 1

A composition consisting of

| | |
|---|---|
| Acicular magnetic powder of $\gamma$-$Fe_2O_3$ (major axis 0.5$\mu$, minor axis 0.07$\mu$, Hc 400 Oe) | 120 parts |
| Titanium coupling agent (marketed by Kenrich Petrochemicals, Inc. under the trade designation "KR-38S") | 4 parts |
| Solvent (Methyl ethyl ketone/toluene 50/50) | 100 parts | was mixed by a powerful mixer for 3 hours, so that the acicular magnetic iron oxide was thoroughly wetted with the coupling agent. Next,

| | |
|---|---|
| Vinyl chloride-vinyl acetate-vinyl alcohol copolymer resin (Union Carbide Corp.'s "VAGH") | 24 parts |
| Polyurethane resin (Nippon Polyurethane Ind. Co.'s "Nippollan 5033" in a 45% ethyl acetate-toluene solution, in terms of 100% solids) | 10.3 parts |
| Methyl ethyl ketone | 250 parts |
| Methyl isobutyl ketone | 150 parts | were mixed well and dissolved on an agitator into a lacquer. Together with the $\gamma$-Fe$_2$O$_3$ particles wetted with the titanium coupling agent, the lacquer was placed in a ball mill and was mixed for 24 hours to effect thorough dispersion of the $\gamma$-Fe$_2$O$_3$ particles.

Then, after the addition of 3 parts behenic acid, the dispersion was continued for one more hour, and a magnetic coating material was prepared. It was coated on a polyester film and, following the necessary finish, the coated film was slitted into a ribbon 3.8 mm wide as an audio cassette tape for 90-minute recording or playback (Specimen 1).

COMPARATIVE EXAMPLE 1

An audio cassette tape (Specimen A) was made by the same procedure as described in Example 1 with the exception that the titanium coupling agent was replaced by a silane one (UCC's "A-1126"). The characteristics of the tapes according to Example 1 and Comparative Example 1 were as summarized in Table 1.

| Spec- imen | Surface quality[1] | Deg. of orien- tation[2] | Running dura- bility[3] | Audio sen- sitivity 12.5 KHz | Audio MoL 333 Hz[4] |
|---|---|---|---|---|---|
| 1 | 10.0 | 2.10 | Over 100 hrs. | +3.0 | +1.5 |
| A | 7.0 | 1.52 | Stops after 10 hrs. | −1.0 | −1.5 |

Remarks:
[1]The surface gloss value as measured on the basis of a reference glass plate which is set at zero decibel (dB).
[2]Measured with the application of a magnetic field of 5000 gauss, by means of Toei Kogyo's orientation meter, Model VSM-III, at Br 1/11.
[3]Determined with Matsushita Communication Ind. Co.'s car stereo set, Model CX-1147P, at an ambient temperature of 50° C. and relative humidity of 70%.
[4]Comparative values measured by Nakamichi's deck, Model 1000, on the basis of TDK's standard tape set at 0.0 dB.

As will be appreciated from Table 1, the titanium coupling agent's effect as a dispersant combined with its favorable effect on the fluidity of the coating material to improve the surface quality and magnetic orientation of the resulting tape. Accordingly, the audio electromagnetic conversion characteristics, such as the audio sensitivity at 12.5 KHz and MoL at 333 Hz, were satisfactory. Further, the force of binding of the titanium coupling agent with the $\gamma$-Fe$_2$O$_3$ particle surfaces enhanced the strength of the magnetic layer, and the cassette tape according to the invention exhibited excellent running durability under the rigorously hot and humid conditions of 50° C. and 70% RH.

EXAMPLE 2

A composition consisting of

| | |
|---|---|
| Acicular magnetic powder of Fe alloy (major axis 0.3μ, minor axis 0.04μ, Hc 1100 Oe) | 120 parts |
| Titanium coupling agent (Kenrich's "KR-38S") | 3.6 parts |
| Solvent (methyl ethyl ketone/toluene 50/50) | 100 parts | was mixed by a powerful mixer for 3 hours and the acicular magnetic iron oxide was wetted well with the coupling agent. Next, the mixture was mixed by a high speed mixer for 70 minutes with

| | |
|---|---|
| Polyvinyl butyral resin (marketed by Sekisui Chemical Co. under the trade mark "BMS") | 15 parts by weight |
| Thermoplastic urethane (marketed by B. F. Goodrich Chemical Co. under the trade mark "Estane 5715") | 15 parts by weight |
| Solvent (methyl ethyl ketone) | 200 parts by weight |
| Lubricant (higher fatty acid-modified silicone oil) | 3 parts by weight | and dispersion was effected by means of a sand mill for 4 hours. After the dispersion, 5 parts by weight, in terms of solids, of an isocyanate compound ("Desmodur L" made by Bayer AG.) capable of cross linking by a reaction with the functional groups composed mostly of the hydroxyl groups of the binder in the magnetic coating material was added to the coating composition already charged in a sand grinding mill, and the mixture was kneaded for 20 minutes. The magnetic coating material thus obtained was applied to a 15 μ-thick polyester film. Following the treatments of the coated film for magnetic field orientation, solvent drying, and surface smoothening, the film was held in a heat-treating oven at 80° C. for 48 hours to effect thermal curing. This film of Example 2 was slitted into a video tape (Specimen 2).

COMPARATIVE EXAMPLE 2

The procedure of Example 2 was repeated with the exception that a silane coupling agent (UCC's "A-1120") was employed instead of the titanium coupling agent, and a video tape (Specimen B) was made. The specimens of Example 2 and Comparative Example 2 were tested, and the results as given in Table 2 were obtained.

TABLE 2

| Spec- imen | Sur- face quali- ty[1] | Electromagnetic convern. charac.[2] | | Repeat- ed run dura- bility[3] 40° C. 60% RH | Drop- out No./ min[4] | Bond str.[5] (g) |
|---|---|---|---|---|---|---|
| | | MHz | Y S/N | | | |
| 2 | 12.0 | 0 | 0 | >200 runs (recipro.) | 0.6 | 60 |
| B | 6.5 | −15 dB | −10 dB | 80 runs (recipro.) | 5 | 5 |

Remarks:
[1]The surface gloss value as measured on the basis of a reference glass plate which is set at zero decibel (dB).
[2]Determined by means of Matsushita Electric's video tape recorder, Model National Maclord 6600.
[3]Determined by means of Matsushita Electric's video tape recorder, Model National Maclord 6600.
[4]Determined by means of Matsushita Electric's video tape recorder, Model National Maclord 6600.
[5]Bonding strength as measured by a test for stripping the coating away from the base under tension.

As is obvious from Table 2, the video tape Specimen 2 was superior to Specimen B in all the test items. It exhibited particularly good adhesion or bonding strength and very few occurrences of dropout.

An example in which magnetic particles were coated with a coupling agent prior to the mixing with a binder is given below.

EXAMPLE 3

| | |
|---|---|
| Acicular magnetic particles of Fe alloy (major axis 0.3μ, minor axis 0.04μ, Hc 1100 Oe) | 120 parts |
| Titanium coupling agent | 3.6 parts |

-continued

| (Kenrich's "KR-38S") | |
|---|---|
| Methyl ethyl ketone | 1000 parts |

These components, including the magnetic powder, were placed simultaneously or in succession into a mixer or blender and were stirred and mixed for 8 hours, so that the titanium coupling agent was adsorbed on the surface of the magnetic particles. The agitation mixer to be employed may be any of known apparatuses, such as a roll mill, ball mill, high speed impeller disperser, homogenizer, or ultrasonic dispersion machine.

The thoroughly stirred and mixed magnetic particles were spread and dried with heat, e.g., at a temperature between 40° and 100° C. for about 30 minutes to 100 hours. In this way the magnetic particles were coated with the titanium coupling agent.

Following this precoating,

| Precoated acicular magnetic particles of Fe alloy | 120 parts by weight |
|---|---|
| Solvent (methyl ethyl ketone/toluene 50/50) | 300 parts by weight |
| Polyvinyl butyral | 15 parts by weight | were mixed by a high speed mixer for 70 minutes, and the mixture was dispersed by a sand mill for 4 hours. After the dispersion, 5 parts by weight, in terms of solids, of an isocyanate compound ("Desmodur L" made by Farbenfabriken Bayer AG) capable of cross-linking by a reaction with the functional groups composed mostly of the hydroxyl groups of the binder in the magnetic coating material was added to the coating composition already charged in a sand grinding mill, and the mixture was kneaded for 20 minutes. The magnetic coating material so obtained was applied to a 15 μ-thick polyester film, and the coated film was treated for magnetic field orientation, solvent drying, and surface smoothening, and then was held in a heat-treating oven at 80° C. for 48 hours to effect thermal curing. This magnetic recording medium of Example 3 was slitted into a video tape (Specimen 3).

Test results of this Specimen 3 are given in Table 3, by way of comparison, together with those of Specimen 2 of Example 2.

TABLE 3

| Specimen | Surface quality[1] | Electromagnetic convern. charac.[2] | | Repeated run durability[3] 40° C. 60% RH | Deposit on head[4] | Bond str.[5] (g) |
|---|---|---|---|---|---|---|
| | | 4 MHz | Y S/N | | | |
| 3 | 15.0 | +0.5 | +2.5 | >200 runs (recipro.) | 4.5 | 75 |
| 2 | 12.0 | 0 | 0 | >200 runs (recipro.) | 4 | 60 |

Remarks:
[1]The surface gloss value as measured on the basis of a reference glass plate which is set at zero decibel (dB).
[2]Determined by means of Matsushita Electric's video tape recorder, Model National Maclord 6600.
[3]Determined by means of Matsushita Electric's video tape recorder, Model National Maclord 6600.
[4]Determined by means of Matsushita Electric's video tape recorder, Model National Maclord 6600.
[5]Bonding strength as measured by a test for stripping the coating away from the base under tension.

It will be understood from Table 3 that the coating composition using the magnetic particles precoated with the titanium coupling agent produces a greater intra-film strength or bonding strength and less deposit on the head than does the composition in which the magnetic particles are simply blended with the binder. With better surface quality, the specimen of this example exhibited improved electromagnetic conversion characteristics, both at RF 4 MHz and in S/N ratio.

Next, the invention will be described in connection with examples in which the magnetic particles and the titanium coupling agent are used with a radiation-sensitive binder synthesized in the manner now to be explained.

In the following examples, a radiation-sensitive modified resin and a radiation-sensitive elastomer are combined for use as a binder for a magnetic recording medium. For the purposes of the invention the "radiation-sensitive modified resin" is desired to be one which, in the premodification state, exhibits a dynamic elastic modulus at 100 Hz of not lower than $1.0 \times 1.0^9$ dyn/cm$^2$ at a temperature between 20° and 60° C. Also, the term "radiation-sensitive, solvent-soluble elastomer" as used herein means an elastomer or a prepolymer, oligomer, or telomer thereof having, as a synthetic rubber, excellent rubber-like elasticity, flexibility, and adhesion to the polyester base. It should have dynamic properties such that its dynamic modulus at 100 Hz is less than $1.0 \times 1.0^9$ dyn/cm$^2$ in the temperature range of 20°-60° C.

Such a thermoplastic resin and a solvent-soluble elastomer are modified for radiation sensitivity, as will be described, to produce a cross-linked structure by radical formation on irradiation. After the modification for radiation sensitivity, the plastic component and the elastomer or its prepolymer, oligomer, or telomer are desired to be compatible, from the viewpoint of the dispersion of fine magnetic particles.

The resinous component and the elastomeric component thus modified for radiation sensitivity are combined, and the resultant is utilized as a binder which forms a three-dimensional network structure upon irradiation. The employment of this binder has proved extremely effective in stabilizing the electromagnetic conversion characteristics of the magnetic recording medium for use in audio, video, memory, measurement, and various other applications. It has also been very effective in maintaining the varied physical properties required of the magnetic coating film, e.g., hardness, flexibility, abrasion resistance, proper friction coefficient, freedom from the "stickslip" phenomenon, surface moldability, adhesion to the base, and modulus of elasticity, under diversified environmental conditions from low to high temperatures and from low to high humidities.

Thermoplastic resins which can be effectively modified for radiation sensitivity in the examples to be given later include the following synthetic resins for paints:

(I) Vinyl chloride-base copolymers

Vinyl chloride-vinyl acetate-vinyl alcohol copolymer, vinyl chloride-vinyl alcohol copolymer, vinyl chloride-vinyl alcohol-vinyl propionate copolymer, vinyl chloride-vinyl acetate-maleic acid copolymer, and vinyl chloride-vinyl acetate-end-OH-side-chain alkyl radical copolymer, e.g., UCC's "VROH", "VYNC", "VYEGX", "VERR", etc.

Especially where a radiation-sensitive modified vinyl chloride-base copolymer is used by exposure to a low dosage of not more than 20 mrads, it has been confirmed that radicals are formed by some reaction upon the irradiation in addition to the radical reaction that results from the radiated functional groups of acrylic double bonds and the like, although the reaction system is yet to be clarified, with the consequence that a cross-linked structure is formed and the binder acts effectively as such for the magnetic recording medium. Further, it is important to effect the radiation-sensitive modification of the copolymer by introducing acrylic double bonds, maleinc acid double bonds, or acrylic double bonds into the copolymer by a technique to be described later.

(II) Saturated polyester resins

Saturated polyester resins prepared by the ester linkage of a saturated polybasic acid, such as phthalic acid, isophthalic acid, terephthalic acid, maleic acid, maleic acid derivative, succinic acid, adipic acid, or sebacic acid, with a polyhydric alcohol, such as ethylene glycol, diethylene glycol, glycerin, trimethylolpropane, 1,2-propylene glycol, 1,3-butanediol, dipropylene glycol, 1,4-butanediol, 1,6-hexanediol, pentaerythritol, sorbitol, neopentyl glycol, or 1,4-cyclohexanedimethanol; and resins (e.g., "Vylon 53S") prepared by modifying the above-mentioned polyester resins with $SO_3Na$ or the like to improve their affinity for magnetic particles. It is essential to modify such a resin by a technique to be described later to make it sensitive to radiation.

(III) Unsaturated polyester resins

Polyester compounds containing radiation-setting, unsaturated double bonds in the molecular chain. They may include, e.g., the unsaturated polyester resins formed by the ester linkage of a polybasic acid and a polyhydric alcohol, mentioned as thermoplastic resins in (II) above, part of the polybasic acid being maleic acid, and containing radiation-setting, unsaturated double bonds; or prepolymers or oligomers of those resins.

The polybasic acid and polyhydric alcohol components of the saturated polyester resins may be the compounds referred to in (I) above, and examples of the radiation-setting, unsaturated double bonds are maleic acid and fumaric acid.

The radiation-setting, unsaturated polyester resins are prepared by adding maleic acid, fumaric acid or the like to at least one polybasic acid component and at least one polyhydric alcohol component, and treating the mixture in the usual manner, i.e., effecting a dehydration or dealcoholization reaction in the presence of a catalyst and in a nitrogen atmosphere at 180°–200° C., and increasing the temperature to the range of 240°–280° C., and then subjecting the resultant to a condensation reaction under a reduced pressure of 0.5–1 mm Hg. In this way the objective polyester resin is obtained. The product may contain maleic acid, fumaric acid or the like in the range of 1–40 molar %, preferably 10–30 molar %, on the basis of the total acid quantity, depending on the cross-linking condition during the manufacture, radiation-setting and other properties of the product.

(IV) Polyvinyl alcohol resins

Polyvinyl alcohol, butyral resin, acetal resin, formal resin, and copolymers of those components are satisfactorily affinitive for magnetic particles. It is important to modify the hydroxyl groups contained in those resins by a technique to be described later so as to make them sensitive to radiation.

(V) Epoxy and phenoxy resins

Epoxy resins obtained by the reaction of bisphenol A with epichlorohydrin or methyl epichlorohydrin, made by Shell Chemical Co. (under the trade marks "Epikote 152, 154, 828, 1001, and 1007"), by The Dow Chemical Co. ("DEN 431", "DER 732", "DER 511", and "DER 331"), and by Dainippon Ink & Chemicals, Inc. ("Epichlon 400" and "Epichlon 800"). Also, the products more highly polymerized than the abovementioned epoxy resins, e.g., UCC's phenoxy resins ("PKHA", "PKHC", and "PKHH") and copolymers of brominated bisphenol A and epichlorohydrin, e.g., Dainippon Ink's products ("Epichlon 145, 152, 153, and 1120") are useful.

(VI) Cellulose derivatives

Cellulose derivatives of varied molecular weights, too, are effective as thermoplastic components. Of those, particularly effective and desirable are nitrocellulose, cellulose acetobutyrate, ethyl cellulose, butyl cellulose, and acetyl cellulose. Even more effective is effecting the modification for radiation sensitivity by utilizing the hydroxyl groups in the resin in conformity with the procedure to be described later.

(VII) Polyester resins

Examples are the compounds containing one or more hydroxyl groups, available in the form of polyfunctional polyethers, e.g., "ADEKA Polyether P-700", "ADEKA Polyether P-1000" and "ADEKA Polyether G-1500" (all made by Asahi Denka Kogyo K. K.) and "Polymeg 1000" and "Polymeg 650" (both made by The Quaker Oats Co.).

(VIII) Polycaprolactones

Examples are the polyfunctional polyesters, e.g., "Polycaprolactone PCP-2000", "Polycaprolactone PCP-0240", and "Polycaprolactone PCP-0300" (made by Chisso Corp.).

Other effective thermoplastics include polyetherester resins, polyvinyl pyrrolidone resins and their derivatives (PVP-olefin copolymers), polyamide resins, polyimide resins, phenol resins, spiroacetal resins, and acrylic resins containing as a polymeric component at least one of acrylic esters and methacrylic esters. They can be made more effective by the radiation-sensitive modification.

On the other hand, the thermoplastic elastomers or prepolymers to be combined with the thermoplastic resins are as follows:

(I) Polyurethane Elastomers and their Prepolymers and Telomers

Among thermoplastic elastomers, urethane compounds are particularly suitable because they are well balanced in properties, imparting excellent abrasion resistance to magnetic coating films, exhibiting desirable adhesion to PEP films, and are capable of thoroughly wetting magnetic particles, thus meeting the essential requirements of a magnetic recording medium.

Useful as examples of those urethane compounds are the polyurethane elastomers and their prepolymers and telomers, which are the products of condensation of various polyvalent isocyanates, such as 2,4-toluene diisocyanate, 2,6-toluene diisocyanate, 1,3-xylene diisocyanate, 1,4-xylene diisocyanate, 1,5-naphthalene diisocyanate m-phenylene diisocyanate, p-phenylene diisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene diisocyanate, isophorone diisocyanate, dicyclohexylmethane diisocyanate, "Desmodur L", and "Desmodur N", with various linear saturated polyesters (formed by condensation of a polyhydric alcohol, such as ethylene glycol, diethylene glycol, glycerin, trimethylolpropane, 1,4-butanediol, 1,6-hexanediol, pentaerythritol, sorbitol, neopentyl glycol, or 1,4-cyclo hexanedimethanol, with a saturated polybasic acid, such as phthalic acid, isophthalic acid, terephthalic acid, maleic acid, succinic acid, adipic acid, or sebacic acid), linear saturated polyethers (polyethylene glycol, polypropylene glycol, and polytetraethylene glycol), caprolactams, or with various polyesters, such as hydroxyl-containing acrylic ester and hydroxyl-containing methacrylic ester.

While these elastomers may be directly combined with various radiation-sensitive modified thermoplastics, it is very effective to modify them to be radiation-sensitive by a reaction with a monomer having acrylic or allylic double bonds reactive with the isocyanate or hydroxyl end groups of the particular urethane elastomer.

(II) Acrylonitrile-Butadiene Copolymer Elastomers

The acrylonitrile-butadiene copolymer prepolymers having a hydroxyl end group and marketed as "Poly-B-D Liquid Resins" by Sinclair Petrochemicals, Inc. and the elastomers "Hycar 1432J", etc. by Nippon Zeon Co. are suitable as the elastomer components in which the double bonds of the butadiene, in particular, form radicals upon irradiation to effect cross linking and polymerization.

(III) Polybutadiene Elastomers

Sinclair Petrochemicals' "Poly-B-D Liquid Resin R-15" and other low-molecular-weight, end-hydroxyl-containing prepolymers are particularly desirable because of their compatibility with thermoplastics and their affinity for magnetic particles. The prepolymer "R15" has hydroxyl end groups, and therefore its radiation sensitivity can be increased by adding acrylic unsaturated double bonds to the molecular ends. The product will be all the more useful as a binder component.

A cyclization product of polybutadiene, e.g., "CBR-M901" marketed by Japan Synthetic Rubber Co., also displays excellent properties when it is combined with a thermoplastic resin. Particularly, the cyclized polybutadiene possesses excellent properties as a binder component, since if efficiently undergoes the cross-linking polymerization upon irradiation, with free radical formation from the unsaturated bonds that originate in the polybutadiene.

Of other thermoplastic elastomers and their prepolymers, the elastomers of chlorinated rubbers, acrylic rubbers, isoprenes, and their cyclization products (e.g., Japan Synthetic Rubber's "CIR701"), epoxy-modified rubbers, and internally-plasticized, saturated linear polyesters (e.g., Toyobo Co.'s "Vylon #300") can be effectively used after subjection to the treatment for radiation-sensitive modification as will be described below.

Typical of the methods for radiation-sensitive modifications involves introduction into the molecules of the elastomers the groups that can be cross-linked or polymerized and dried by irradiation, e.g., acrylic double bonds as of acrylic acid, methacrylic acid, or an ester compound thereof, allylic double bonds as of diallyl phthalate, or unsaturated bonds as of maleic acid or maleic acid derivative, all of which are unsaturated double bonds adapted for radical polymerization.

Other unsaturated double bonds may be employed provided they can be cross-linked and polymerized by exposure to radiation.

To be more concrete, the practical procedures for modification for radiation sensitivity are as follows:

(I) A polyisocyanate compound is reacted with a thermoplastic resin or a thermoplastic elastomer or prepolymer having one or more hydroxyl groups in the molecule at a rate of one or more molecules of the isocyanate group of the former to a molecule of the latter. Next, the resultant is reacted with a monomer having groups reactive to the isocyanate group and also having unsaturated double bonds that harden upon irradiation at a rate of one molecule of the former to one or more molecules of the latter. The reaction product, e.g., a saponified vinyl chloride-vinyl acetate copolymer (UCC's "VAGH"), is again reacted with toluene diisocyanate at a rate of one hydroxyl group of the copolymer to one molecule of the latter. The product is further reacted with 2-hydroxyethyl methacrylate at a rate of one hydroxyl group to one molecule. The vinyl chloride-vinyl acetate copolymer resin thus obtained carries the acrylic double bonds in a pendant fashion.

Examples of the polyisocyanate compounds useful for the above purpose are 2,4-toluene diisocyanate, 2,6-toluene diisocyanate, 1,3-xylene diisocyanate, 1,4-xylene diisocyanate, m-phenylene diisocyanate, p-phenylene diisocyanate, hexamethylene diisocyanate, isophorone diisocyanate, "Desmodur L", and "Desmodur IL" (both made by Farbenfabriken Bayer AG of West Germany).

The monomers having groups reactive with the isocyanate group and also having radiation-setting, unsaturated double bonds include hydroxyl-containing esters, such as 2-hydroxyethyl ester, 2-hydroxypropyl ester, and 2-hydroxyoctyl ester, of acrylic and methacrylic acids; monomers having active hydrogen reactive with the isocyanate group and also having acrylic double bonds, such as acrylamide, methacrylamide, and n-methylolacrylamide; and monomers having active hydrogen reactive with the isocyanate group and also containing radiation-setting, unsaturated double bonds, such as allyl alcohols, maleic acid esters of polyhydric alcohols, and mono- and diglycerides of long-chain fatty acids having unsaturated double bonds.

(II) A reaction product of a compound having at least one epoxy group in the molecule and a monomer having groups reactive with the epoxy group and also having radiation-setting, unsaturated double bonds, at a rate of one molecule of the former to one or more molecules of the latter, e.g., an epoxy-containing thermoplastic resin obtained by radical polymerization with glycidyl alcohol, is reacted with acrylic acid. Thus, by the ring-opening reaction of the carboxyl and epoxy groups, a resin, prepolymer, or oligomer is obtained which carries the acrylic double bonds as a pendant. Also, maleic acid may be reacted so that a resin, prepolymer, or oligomer having radiation-setting, unsaturated double bonds in the molecular frame as a result of the ring-opening reaction of the carboxyl and epoxy groups.

The compounds containing one or more epoxy groups in the molecule include homopolymers of epoxy-containing acrylic ester and methacrylic ester, such as glycidyl acrylate and glycidyl methacrylate, or their copolymers with other polymerizable monomers, such as "Epikote 828", "Epikote 1001", "Epikote 1007", and "Epikote 1009"(all made by Shell Chemical Co.) which have already been referred to in Section (V) above. Various other types of epoxy resins may also be employed.

Among the useful monomers having the group reactive with the epoxy group and also having radiation-setting, unsaturated double bonds are carboxyl-containing acrylic monomers or acrylic and methacrylic acids, and acrylic monomers having primary or secondary amino groups, such as methylaminoethyl acrylate and methylaminoethyl methacrylate. In addition, polybasic acid monomers having radiation-setting, unsaturated double bonds, as of maleic acid, fumaric acid, crotonic acid, and undecylenic acid, may be used.

(III) A reaction product of a compound containing at least one carboxyl group in the molecule and a monomer having groups reactive with the carboxyl group and also having radiation-setting, unsaturated double bonds, at a rate of one molecule of the former to one or more molecules of the latter. For example, a carboxyl-containing thermoplastic resin obtained by solution polymerization of methacrylic acid is reacted with glycidyl methacrylate, and, in the same manner as in Section (II) above, a resin, prepolymer, or oligomer in whose molecules have been introduced acrylic double bonds by the ring-opening reaction of carboxyl and epoxy groups is prepared.

The compounds that contain one or more carboxyl groups in the molecule are, among the above-mentioned resins that contain carboxyl groups in the molecular chain or at the end of a chain in the molecule, polyesters and the homopolymers of monomers having the radical polymerizability and containing carboxyl groups, such as acrylic acid, methacrylic acid, maleic anhydride, and fumaric acid, or their copolymers with other polymerizable monomers.

The monomers that have the group reactive with the carboxyl groups and having radiation-setting, unsaturated double bonds are glycidyl acrylate, glycidyl methacrylate, and the like.

Where a solvent is to be employed, a ketone, such as acetone, methyl ethyl ketone, methyl isobutyl ketone, or cyclohexanone; andester, such as ethyl acetate or butyl acetate; an alcohol, such as methanol, ethanol, isopropanol, or butanol, which cannot be used with the isocyanate thermosetting resin; tetrahydrofuran, dioxane, or other compound having an ether bond; a solvent, such as dimethyl formamide or vinylpyrrolidone; or an aromatic hydrocarbon diluent or solvent, such as toluene or xylene, may be used.

The substrate to be coated may be the polyethylene terephthalate film that is in wide use as a backing material for magnetic recording media. Where heat resistance is an important consideration, a polyimide film, polyamide imide film or the like may be utilized. In the case of a polyester film as a thin base, it is often used after monoaxial or biaxial stretching.

Fine magnetic powders which may be used in Examples to be given later are finely divided $\gamma$-$Fe_2O_3$, $Fe_3O_4$, Co-doped $\gamma$-$Fe_2O_3$, Co-doped $\gamma$-$Fe_2O_3$-$Fe_3O_4$ solid solution, $CrO_2$, Co-base-compound-coated $\gamma$-$Fe_2O_3$, and Co-base-compound-coated $Fe_3O_4$ (including those oxidized to an intermediate state between itself and $\gamma$-$Fe_2O_3$). (The term "Co-base compounds" as used herein means cobalt oxide, cobalt hydroxide, cobalt ferrite, cobalt ion-absorbates and the like which enable the magnetic powder to take advantage of the magnetic anisotropy of cobalt in improving its coercive force.) Also, the magnetic powder may consist essentially of a ferromagnetic metal element or elements, such as Co or Fe-Co, Fe-Co-N, or Co-Ni system. Such a fine magnetic powder is prepared in a number of ways, which include wet reduction of the starting material with a reducing agent such as $BH_4$, a treatment of the iron oxide surface with a Si compound and subsequent wet reduction with $H_2$ gas or the like, and vacuum evaporation in a low-pressure argon gas stream. Fine particles of monocrystalline barium ferrite may be employed as well. The fine magnetic powder is used in the form of acicular or granular particles, depending on the application of the resulting magnetic recording medium.

In the field of high-bias hi-fi sound cassette tapes, video cassette tapes, video tapes, master tapes for contact transfer printing and the like. The technical progress in recent years has been striking, and the market is fast growing. As a new addition to this field, a high-performance tape possessing both extremely desirable electromagnetic conversion characteristics and physical reliability has now been provided, in accordance with the present invention, by combining a binder of a radiation cross-linked type or radiation polymerized and dried type with a fine magnetic powder, especially a cobalt-modified acicular iron oxide (cobalt-doped or Co-base-compound-coated type) advantageous for high-density recording applications or with acicular fine alloy particles having even greater coercive force.

With the binder type of the radiation-setting type or for the manufacture of a magnetic recording medium, it is advisable to use various additives usually employed for these applications, such as an antistatic agent, lubricant, dispersant, and film-reinforcing agent, to suit the particular end use.

Highly energetic rays for use in cross-linking the magnetic coating may be radiant rays from a radiation accelerator as the source, gamma radiation from $Co^{60}$, or X-rays from an X-ray generator.

The use of rays from a radiation accelerator is particularly advantageous in view of the case of control of the dosage, introduction into the process line, shield from the ionizing radiation, etc.

With regard to the characteristics of radiation for use in curing the magnetic coating, it is desirable from the standpoint of transmissivity to adopt a radiation accelerator which operates with an acceleration voltage of 100–750 kv, preferably 150–300 kv, and effect the irradiation so that the radiation dosage may be in the range of 0.2–20 megarads.

In the case of a magnetic tape, in particular, the film of coating to be cured is thin, and therefore the adoption of the low-dosage radiation accelerator made by Energy Science Inc. of the U.S. ("Electro-curtain system") or the equivalent is extremely advantageous because of the ease with which the accelerator can be installed on the tape coating line and the shield can be established against secondary X-rays inside the apparatus.

Of course, the Van de Graff accelerator in extensive use as a radiation accelerator may be employed instead.

In radiation cross-linking, exposure of the recording medium to radiation in a stream of $N_2$, He, or other inert gas is important. A film of magnetic coating, which is very thickly filled with a magnetic pigment, is highly porous in structure. When it is exposed to radiation in air, $O_3$ and the like produced by the irradiation for the cross-linking of the binder component will have an adverse effect, keeping the radicals formed in the polymer from effectively acting for the cross-linking reaction. The adverse effect is exercised not merely on the surface of the magnetic coating layer but also deep into the porous film, thus hampering the cross-linking of the binder.

For this reason it is essential to maintain an inert gas atmosphere of $N_2$, He, $CO_2$, or the like with an oxygen concentration of at most one percent around the portion to be exposed to the highly energetic rays.

Next, examples of synthesis of radiation-sensitive binders will be given below.

Process for Preparing Adducts of Tolylene Diisocyanate (a) Synthesis of an acrylic modification product of vinyl chloride-vinyl acetate copolymer resin (radiation-sensitive modified resin):

A five-liter, four-necked flask is charged with 750 parts of "Vinylite VAGH", 1250 parts of toluene, and 500 parts of cyclohexanone. The charge is dissolved with the application of heat. After the solution has been heated to 80° C. 61.4 parts of 2-hydroxyethyl methacrylate adduct of tolylene diisocyanate* is added. Then, 0.012 part each of tin octylate and hydroquinone are added. The whole mixture is reacted in a stream of $N_2$ at 80° C. for a period of time until an NCO reaction rate of over 90% is attained. Following the conclusion of the reaction, the product is cooled and diluted with 1250 parts of methyl ethyl ketone. The synthesized product is used as a binder (a).

* Process for preparing the 2-hydroxyethyl methacrylate (2HEMA) adduct of tolylene diisocyanate (TDI):

In an $N_2$ stream within a one-liter, four-necked flask, 348 parts of tolylene diisocyanate is heated to 80° C., and then 260 parts of 2-hexaethylene methacrylate, 0.07 part of tin octylate, and 0.05 part of hydroquinone are added dropwise while the temperature inside the reactor is being controlled to be within the range of 80°–85° C. After the addition, the mixture is stirred at 80° C. for 3 hours to conclude the reaction. Following the conclusion of the reaction, the product is taken out and cooled. In this way a white paste of a 2HEMA adduct of TDI was obtained.

(b) Synthesis of an acrylic modification product of butyral resin (radiation-sensitive modified resin):

One hundred parts of a butyral resin "BM-S" marketed by Sekisui Chemical Co. is charged, together with 191.2 parts of toluene and 71.4 parts of cyclohexanone, into a five-liter, four-necked flask. The charge is dissolved with heat, the temperature is increased to 80° C., and 7.4 parts of the 2-hydroxyethyl methacrylate adduct of tolylene diisocyanate* is added. Further, 0.015 part each of tin octylate and hydroquinone are added, and the mixture is allowed to react at 80° C. in an $N_2$ stream until an NCO reaction rate in excess of 90%, is obtained. Following the conclusion of the reaction, the product is cooled and diluted with methyl ethyl ketone.

The synthesized product is used as a binder (b).

(c) Synthesis of an acrylic modification product of saturated polyester resin (radiation-sensitive modified resin):

One hundred parts of Toyobo's "Vylon RV-200" is dissolved with heat in 116 parts each of toluene and methyl ethyl ketone, the temperature is raised to 80° C., and 3.55 parts of the 2HEMA adduct of TDI* and then 0.007 part each of tin octylate and hydroquinone are added. The whole mixture is caused to react in an $N_2$ stream at 80° C. up to an NCO reaction rate of over 90%.

(d) Synthesis of an acrylic modification product of epoxy resin (radiation-sensitive modified resin):

In 50 parts each of toluene and MEK is dissolved 400 parts of Shell Chemical's "Epikote 1007" with the application of heat. Then, 0.006 part of N,N-dimethylbenzylamine and 0.003 part of hydroquinone are added to the solution, the mixture is heated to 80° C., and 69 parts of acrylic acid is added dropwise. The whole mixture is reached at 80° C. until an acid value of less than 5 is reached.

(e) Synthesis of an acrylic modification product of urethane elastomer (radiation-sensitive elastomer):

A reaction vessel is charged with 250 parts of an urethane prepolymer of diphenylmethane diisocyanate (MDI) having isocyanate end groups ("Nippollan 4040" marketed by Nippon Polyurethane Ind. Co.), 32.5 parts of 2HEMA, 0.07 part of hydroquinone, and 0.009 part of tin octylate. The mixture is dissolved by heating at 80° C., 43,5 parts of TDI is added in drops while the reaction vessel is being cooled so that a temperature in the range of 80°–90° C. is maintained. Following the addition, the mixture is allowed to react until an NCO reaction rate of over 95% is achieved.

(f) Synthesis of an acrylic modification product of polyether-type modified elastomer with urethane end groups (radiation-sensitive elastomer):

Two hundred and fifty parts of Nippon Polyurethane's "PTG-500", 32.5 parts of 2HEMA, 0.007 part of hydroquinone, and 0.009 part of tin octylate are placed altogether into a reaction vessel. The charge is dissolved by heating at 80° C., and 43.5 parts of TDI is added dropwise while cooling the reaction vessel to maintain a temperature inside within the range of 80°–90° C. Following the addition, a reaction is effected to achieve an NCO reaction rate of more than 95%.

(g) Synthesis of an acrylic modification product of polybutadiene elastomer (radiation-sensitive elastomer):

A reaction vessel is charged with 250 parts of Sinclair Petrochemicals' low-molecular-weight, hydroxyl-end-group polybutadiene "Poly-B-D Liquid Resin R-15", 32.5 parts of 2HEMA, 0.007 part of hydroquinone, and 0.009 part of tin octylate. The charge is dissolved by heating at 80° C., and 43.5 parts of TDI is added dropwise while cooling the reaction vessel to maintain a temperature inside within the range of 80°–90° C. After the addition, the mixture is caused to react until an NCO reaction rate of over 95% is attained.

(h) Synthesis of an allyl-group-introduced EBC resin (TDI-allyl alcohol adduct):

After 348 parts of TDI has been heated in an $N_2$ stream at 80° C., 116 parts of allyl alcohol, 0.07 part of tin octylate, and 0.02 part of hydroquinone are added in drops while cooling and controlling the temperature inside the reaction vessel within the range of 80°–85° C. After the dropping, the mixture is reacted with stirring at 80° C. for 3 hours.

(Example of resin synthesis)

Fifteen parts of 2-hydroxyethyl methacrylate, 35 parts of butyl methacrylate, and 37.5 parts each of toluene and MEK are placed in a reaction vessel, heated to 80° C., and then 45 parts of 2HEMA, 105 parts of butyl methacrylate, 6 parts of benzoyl peroxide, and 112.5 parts of toluene are added dropwise. The whole mixture is reacted at 80°–90° C. for 4 hours. To 195 parts of the reaction product, 46.6 parts of TDI-allyl alcohol adduct and then 0.01 part each of tin octylate and hydroquinone are added. The mixture is reacted at 80° C. up to an NCO reaction rate in excess of 90%.

(i) Synthesis of unsaturated polyester-type EBC resin:

A reaction vessel was charged with 136 parts of dimethyl sebacate, 12.2 parts of dimethyl adipate, 64.8 parts of dimethyl maleate, 73 parts of neopentyl glycol, 74 parts of 1,6-hexanediol, and 10 parts of tetra-n-butyl titanate. After a demethanolizing reaction at 180° C. in an $N_2$ stream, the resultant is heated to 240°–260° C. and subjected to a condensation reaction under a reduced pressure of 0.5–1 mmHg. In this manner a resin closely resembling an internally plasticized elastomer resulted.

The invention will now be described in connection with examples in which a radiation-setting titanium coupling agent (e.g., Kenrich's "KR-7" or "KR-55") was added as a dispersant to each reaction mixture. Examples 4 through 7 illustrate a procedure in common wherein magnetic particles are wetted with a coupling agent and then are mixed and dispersed with a binder.

EXAMPLE 4

A composition consisting of

| | |
|---|---|
| Cobalt-deposited acicular $\gamma$-$Fe_2O_3$ (major axis $0.4\mu$, minor axis $0.05\mu$, Hc 600 Oe) | 120 parts by weight |
| Carbon black (for antistatic use, "Mitsubishi Carbon Black Ma-600") | 5 parts by weight |
| $\alpha$-$Al_2O_3$ powder (particle size $0.5\mu$) | 2 parts by weight |
| Titanium coupling agent (Kenrich's "KR-7") | 3 parts by weight |
| Solvent (methyl ethyl ketone/toluene 50/50) | 100 parts by weight | was mixed on a ball mill for 3 hours, so that the acicular iron oxide particles were thoroughly wetted with the titanium coupling agent.

Next, a binder mixture consisting of

| | |
|---|---|
| Acrylic double-bond-introduced, saturated polyester resin (c) | 10 weight parts (on solids basis) |
| Acrylic double-bond-introduced vinyl chloride-vinyl acetate copolymer (a) | 10 weight parts (on solids basis) |
| Acrylic double-bond-introduced polyether urethane elastomer (f) | 10 weight parts (on solids basis) |
| Solvent (methyl ethyl ketone/toluene 50/50) | 200 weight parts (on solids basis) |
| Lubricant (higher fatty acid-modified silicone oil) | 3 weight parts (on solids basis) | was mixed well and dissolved. The resultant was placed into the ball mill where the magnetic powder had been treated in advance, and the two were again mixed and dispersed for 42 hours.

The magnetic coating material thus obtained was applied to a 15 $\mu$-thick polyester film, magnetically oriented on a (1600-gauss) permanent magnet, and the solvent was dried away by an infrared lamp or hot air. The coating surface was smoothened and the film was hardened by irradiation with radiant rays in an $N_2$ atmosphere by ESI's "Electro-curtain" type radiation accelerator at an acceleration voltage of 150 keV with an electrode current of 20 mA to a total dosage of 10 mrads.

The tape thus obtained was slitted into a ribbon ½-in. wide as a video tape (Specimen 4).

The cross-linking of this magnetic film is understood to have resulted from the combination of cross-linking by radicalization of the acrylic double bonds and cross-linking by the radicals formed in the molecular chains of vinyl chloride and vinyl acetate (possibly due to HCl removal but yet to be clarified).

Comparative Example 3

A composition consisting of

| | |
|---|---|
| Cobalt-deposited acicular $\gamma$-$Fe_2O_3$ (major axis $0.4\mu$, minor axis $0.05\mu$, Hc 600 Oe) | 120 parts by weight |
| Carbon black (for antistatic use, "Mitsubishi Carbon Black MA-600") | 5 parts by weight |
| $\alpha$-$Al_2O_3$ powder (particle size $0.5\mu$) | 2 parts by weight |
| Silane coupling agent (UCC's "A-189") | 3 parts by weight |
| Solvent (methyl ethyl ketone/toluene 50/50) | 100 parts by weight | was mixed on a ball mill for 3 hours, so that the acicular iron oxide particles were thoroughly wetted with the silane coupling agent. Next, a binder mixture consisting of

| | |
|---|---|
| Acrylic double-bond-introduced, saturated polyester resin (c) | 10 weight parts (on solids basis) |
| Acrylic double-bond-introduced vinyl chloride-vinyl acetate copolymer (a) | 10 weight parts (on solids basis) |
| Acrylic double-bond-introduced polyether urethane elastomer (f) | 10 weight parts (on solids basis) |
| Solvent (methyl ethyl ketone/toluene 50/50) | 200 weight parts (on solids basis) |
| Lubricant (higher fatty acid-modified silicone oil) | 3 weight parts (on solids basis) | was mixed well and dissolved. The resultant was placed into the ball mill where the magnetic powder had been treated in advance, and the two were again mixed and dispersed for 42 hours.

The magnetic coating material thus obtained was applied to a 15 $\mu$-thick polyester film, magnetically oriented on a (1600-gauss) permanent magnet, and the solvent was dried away by an infrared lamp or hot air. The coating surface was smoothened and the film was hardened by irradiation with radiant rays in an $N_2$ atmosphere by ESI's "Electro-curtain" type radiation accelerator at an acceleration voltage of 150 keV with an electrode current of 20 mA to a total dosage of 10 mrads.

The tape thus obtained was slitted into a ribbon ½-in. wide as a video tape (Specimen C).

The cross-linking of the magnetic film is understood to have resulted from the combination of cross-linking by radicalization of the acrylic double bonds and cross-linking by the radicals formed in the molecular chains of vinyl chloride and vinyl acetate (possibly due to HCl removal but yet to be clarified).

FIG. 1 is a graph showing the rates of attenuation (on still reproduction) of signals with respect to the reproduction output, as measured by recording signals on the video tape specimens by a video tape recorder (Matsushita Electric's "NV-3120") for open reels conforming to the EIAJ unified standards and then by reproducing the still images with a tension of 200 grams applied on the take-up side by a spring balancer.

As can be seen from the graph, the cross-linking of the binder by irradiation gives a coating film of a tough structure and markedly reduces the rate of signal attenuation, regardless of the rigorous abrasive condition with a relative velocity of the magnetic film and the head as high as 11 meters a second.

Figure 2:
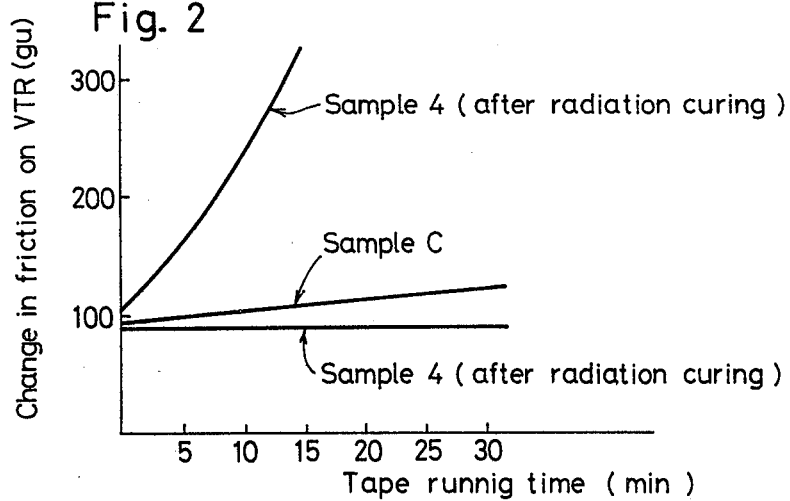
FIG. 2 is a graph showing changes in friction on a video tape recorder with the tape running time.

FIG. 2 is a graphic representation of changes in friction of test video tapes with running time. Each tape was held for five days under changing conditions in five cycles, each beginning with a temperature of −10° C. and a relative humidity of 0% and ending with 60° C. and 80%. After this period, the specimen was kept still at room temperature for 24 hours. The tape was then put on the same video tape recorder as used for the still reproduction test, a tension analyzer marketed by Japan Automatic Control Co., Model 1VA-500, was set between the head drum and the pinch roller of the recorder, and the changes in tension on the take-up side of the test tape with running time were measured.

This test permits evaluation of not only the friction coefficient level of the magnetic film itself of each test tape but also the degree of deterioration of tape running quality due to exudation of the low-molecular-weight components from the magnetic film, and stability of the tape against the environmental conditions such as temperature and humidity.

Also, as indicated in Table 4, it has been found that the frequency of output is decreased and the bonding strength improved by the radiation cross-linking. Thus, the dropout problem has now been solved by this invention.

TABLE 4

| Spec-<br>imen | Surface<br>quality[1] | Electromagnetic<br>convern. charac.[2] | | No. of<br>dropouts<br>per min.[3] | Bond<br>str.[4]<br>(g) |
|---|---|---|---|---|---|
| | | 4 MHz | Y S/N | | |
| 4 | 12.0 | 0 | 0 | 0.3 | 80 |
| C | 7.5 | −12 dB | −8.0 dB | 6 | 15 |

Remarks:
[1]The surface gloss value as measured on the basis of a reference glass plate which is set at zero decibel (dB).
[2]Determined with Matsushita Electric's video tape recorder, Model National Maclord 6600.
[3]Determined with Matsushita Electric's video tape recorder, Model National Maclord 6600.
[4]Bonding strength as measured by a test for stripping the coating away from the base under tension.

As compared with Specimen C, Specimen 4 was confirmed to have been stably uniformalized in cross-linking by irradiation, with superior surface quality and improved electromagnetic conversion characteristics.

EXAMPLE 5

A composition consisting of

| | |
|---|---|
| Acicular magnetic powder of Fe alloy (major axis 0.3μ, minor axis 0.04μ, Hc 1100 Oe) | 120 parts by weight |
| Radiation-setting titanium coupling agent (Kenrich's "KR-55") | 0.6 part |
| Solvent (methyl ethyl ketone/toluene 50/50) | 100 parts | was mixed by a powerful mixer for 3 hours, so that the fine particles of magnetic alloy were thoroughly wetted with the titanium coupling agent. Next, a mixture consisting of

| | |
|---|---|
| Acrylic double-bond-introduced butyral resin (b) | 18 weight parts (on solids basis) |
| Acrylic double-bond-introduced urethane elastomer (e) | 12 weight parts (on solids basis) |
| Solvent (methyl ethyl ketone/toluene 50/50) | 200 weight parts (on solids basis) |
| Lubricant (higher fatty acid) | 3 weight parts (on solids basis) | was mixed well and dissolved.

The resultant was thoroughly mixed with the pre-treated magnetic powder by a high speed mixer for 70 minutes and then mixed and dispersed by a sand grinding mill for a further period of 4 hours.

The magnetic coating material thus prepared was applied to a 12 μ-thick polyester film. After magnetic field orientation, solvent drying, and surface smoothening, the coated film was exposed to radiation in an N₂ gas atmosphere in an "Electro-curtain" type radiation accelerator at an acceleration voltage of 150 keV with an electrode current of 10 mA to a total dosage of 5 mrads.

The tape so obtained was slitted into a ribbon 3.8 mm wide as an alloy audio cessette tape (Specimen 5).

Comparative Example 4

A composition consisting of

| | |
|---|---|
| Acicular magnetic powder of Fe alloy (major axis 0.3μ, minor axis 0.04μ, Hc 1100 Oe) | 120 parts by weight |
| Silane coupling agent (UCC's "A 189") | 2 parts by weight |
| Solvent (methyl ethyl ketone/toluene 50/50) | 100 parts by weight | was mixed on a ball mill for 3 hours, and the acicular magnetic iron oxide particles were thoroughly wetted with the silane coupling agent.

Next, a binder mixture consisting of

| | |
|---|---|
| Acrylic double-bond-introduced, saturated polyester resin (c) | 10 weight parts (on solids basis) |
| Acrylic double-bond-introduced vinyl chloride-vinyl acetate copolymer (a) | 10 weight parts (on solids basis) |
| Acrylic double-bond-introduced polyether urethane elastomer (f) | 10 weight parts (on solids basis) |
| Solvent (methyl ethyl ketone/toluene 50/50) | 200 weight parts (on solids basis) |
| Lubricant (higher fatty acid-modified silicone oil) | 3 weight parts (on solids basis) | was mixed well and dissolved. The resultant was placed into the ball mill where the magnetic powder had been treated in advance, and the two were again mixed and dispersed for 42 hours.

The magnetic coating material thus obtained was applied to a 15 μ-thick polyester film, magnetically oriented on a (1600-gauss) permanent magnet, and the solvent was dried away by an infrared lamp or hot air. The coating surface was smoothened and the film was hardened by irradiation with radiant rays in an N₂ atmosphere by ESI's "Electro-curtain" type radiation accelerator at an acceleration voltage of 150 keV with an electric current of 20 mA to a total dosage of 10 mrads.

The tape thus obtained was slitted into a ribbon ½-in. wide as a video tape (Specimen D).

Specimen D was compared in tests with Specimen 5. The results were as shown in Table 5.

TABLE 5

| Specimen[1] | Surface quality (dB) | Electromag. convn. charac.[3] | | | Tape squeal[4] (hr) | Recipro. run durability[5] (No. of pass) |
|---|---|---|---|---|---|---|
| | | MoL 33 Hz (dB) | MoL 8 KHz (dB) | MoL 16 KHz (dB) | | |
| 5 | 12.4 | +3.5 | +6.5 | +12.0 | 30 | Over 200 |
| D | 8.5 | +2.5 | +3.0 | +8.5 | 10 | Stopped after 50 passes |

Remarks:
[1]After radiation setting.
[2]The surface gloss value as measured on the basis of a reference glass plate which is set at zero decibel (dB).
[3]Determined with Nakamichi Research Institute's cassette deck, Model Nakamichi 582, in the metal position.
[4]Determined at 40° C. and 80% RH with Matsushita Communication Ind.'s car stereo set, Model National CX-318.
[5]Determined at 40° C. and 60% RH with Matsushita Communication's car stereo set, Model CX-1147D.

The radiation-sensitive elastomer component used in this Example of the invention can be of a low molecular weight because of its subjection to radiation cross-linking. Hence it is affinitive for the alloy magnetic particles and imparts the magnetic coating material with an excellent surface-forming property after application.

Consequently, the tape so formed possessed very high sensitivity over the MoL range from the low frequency of 333 Hz up to the high frequency of 16 KHz.

As measures of reliability, the period of running time the tape took to begin squealing and the durability of the tape with reciprocating travel from reel to reel past the head of a car stereo set were determined. In these and other tests it was confirmed that the tape according to the invention had greater durability and reliability in unfavorable environments, such as high temperatures and high humidities.

EXAMPLE 6

| | |
|---|---|
| $\gamma$-Fe$_2$O$_3$ (major axis 0.8$\mu$, minor axis 0.2$\mu$, Hc 300 Oe) | 120 parts by weight |
| Carbon black (for antistatic use, "Mitsubishi Carbon Black MA-600") | 5 parts by weight |
| $\alpha$-Al$_2$O$_3$ powder (particle size 0.5$\mu$) | 2 parts by weight |
| Titanium coupling agent (Kenrich's "KR-11") | 3.6 parts by weight |
| Solvent (methyl ethyl ketone/toluene 50/50) | 100 parts by weight |

These components were mixed up by a ball mill for 3 hours, and the the magnetic iron oxide was thoroughly wetted with the titanium coupling agent.

Next,

| | |
|---|---|
| Acrylic double-bond-introduced eposy resin (d) | 15 parts by weight |
| Acrylic double-bond-introduced polybutadiene elastomer (g) | 15 parts by weight |
| Solvent (methyl ethyl ketone/toluene 50/50) | 200 parts by weight |
| Lubricant (fluorine oil, E.I. du Pont de Nemours' "Kritox") | 3 parts by weight | were mixed well and dissolved.

The resultant was placed into the ball mill where the magnetic powder had been treated in advance, and the two were again mixed and dispersed for 42 hours.

The magnetic coating material thus prepared was applied to one side of a 188 $\mu$-thick polyester film to form a coating film about 10$\mu$ thick, and the coating was dried, and then the coated surface was smoothened. The coating film was hardened by irradiation in an N$_2$ gas atmosphere by an "Electro-curtain" type radiation accelerator at an acceleration voltage of 175 keV with an electrode current of 15 mA to a total dosage of 2 mrads.

A disk (about 65 mm in diameter) was blanked out of the resulting roll, and magnetic disk (Specimen 6) was obtained.

The same coating material was applied on a 75 $\mu$-thick polyester film and after a similar process, a sealless commutation ticket of a given size was cut out of the coated film.

EXAMPLE 7

| | |
|---|---|
| $\gamma$-Fe$_2$O$_3$ (major axis 0.8$\mu$, minor axis 0.2$\mu$, Hc 300 Oe) | 120 parts by weight |
| Carbon black (for antistatic use, "Mitsubishi Carbon Black MA-600") | 5 parts by weight |
| $\alpha$-Al$_2$O$_3$ powder (particle size 0.5$\mu$) | 2 parts by weight |
| Titanium coupling agent (Kenrich's "KR-39CS") | 6 parts by weight |
| Solvent (methyl ethyl ketone/toluene 50/50) | 100 parts by weight |

These components were mixed up by a ball mill for 3 hours, and the magnetic iron oxide was thoroughly wetted with the titanium coupling agent.

Next,

| | |
|---|---|
| Allyl-group-introduced methacrylic resin | 15 weight parts (on solids basis) |
| Internally-plasticized unsaturated polyester resin | 15 weight parts (on solids basis) |
| Solvent (methyl ethyl ketone/toluene 50/50) | 200 weight parts (on solids basis) |
| Lubricant (fatty acid-modified siloxane) | 3 weight parts (on solids basis) | were mixed well and dissolved. The resultant was placed into the ball mill where the magnetic powder had been treated beforehand, and the two were again mixed for 42 hours.

The magnetic coating material thus prepared was applied to one side of a 188 $\mu$-thick polyester film to form a coating film about 10 $\mu$-thick, and the coating was dried, and then the coated surface was smoothened. The coating film was hardened by irradiation in a CO$_2$ gas atmosphere by an "Electro-curtain" type radiation accelerator at an acceleration voltage of 175 keV with an electrode current of 15 mA to a total dosage of 2 mrads.

A disk (about 65 mm in diameter) was blanked out of the resulting roll, and a magnetic disk (Specimen 7) was obtained.

Each of the test magnetic disks was set on a recorder-reproducer and was driven to run at a speed of about one meter per second in sliding contact with the magnetic head (at a pad pressure of 40 g/cm$^2$), and the time elapsed until the cumulative number of dropouts reached 1000 was measured.

The results of time measurements and the surface conditions at the ends of the periods are summarized in Table 6.

COMPARATIVE EXAMPLES 5 & 6

The procedures of Examples 6 and 7 were repeated, respectively, with the exception that the titanium coupling agents were replaced by a silane coupling agent (UCC's "A-189"), and similar pieces of magnetic recording medium were obtained. As Specimens E and F, their test results and appearances are also given in Table 6.

TABLE 6

| Specimen (after exposure to radiation) | Running time (hr) | Surface condition |
| --- | --- | --- |
| 6 | Over 50 | Good |
| E | Failed in 30 | Serious scratches |
| 7 | Over 50 | Good |
| F | Failed in 30 | Serious scratches |

The table makes it certain that the magnetic coating attains strength on exposure to radiation.

The specimen of Example 6 as a sealless commutation ticket was tested for gate endurance, together with Comparative Specimen E. The results are shown in FIG. 3.

The curves represent the attenuation rates (in Em) of the peak voltages of the reproduction outputs after repeated passes through the gate, on the basis of the initial reproduction output peak voltage as 100%. Usually, the point where the reproduction output peak voltage has dropped from the initial standard output voltage by more than 25% is judged to be the end of the ticket life.

Figure 3:
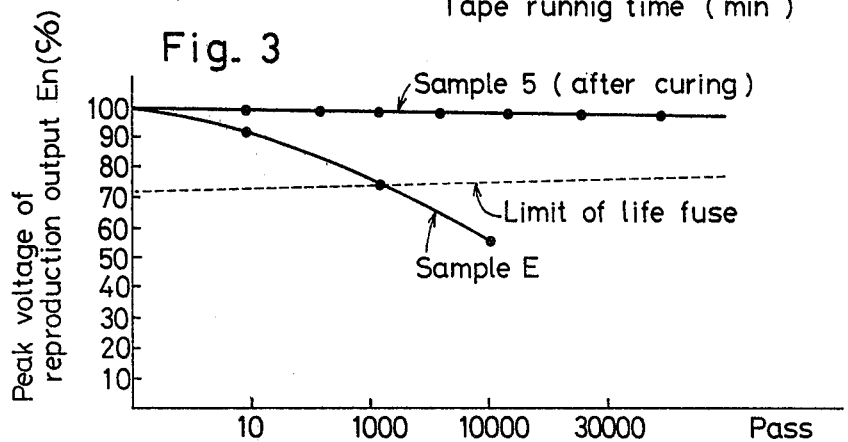
FIG. 3 is a graph showing the relation between the peak voltage of reproduction output and the number of passes.

As shown in FIG. 3, the pulse signal peak voltage levels up to the maximum number of repeated passes of 30000 were observed.

It was confirmed that the decline of the output with the frequency of reproduction by the test medium was reduced to a minimum and a remarkable improvement in this respect was achieved by the radiation cross-linking in accordance with the invention.

Now, modifications of the invention in which the magnetic particles are coated with a radiation-setting titanium coupling agent (Kenrich's "KR-7" or "KR-55") will be described in connection with Examples 8 through 11.

EXAMPLE 8

A composition consisting of

| | |
| --- | --- |
| Cobalt-deposited, acicular α-Fe$_2$O$_3$ (major axis 0.4μ, minor axis 0.05μ, Hc 600 Oe) | 120 parts by weight |
| Titanium coupling agent (Kenrich's "KR-7") | 2.5 parts by weight |
| Solvent (methyl ethyl ketone/toluene 50/50) | 500 parts by weight | was mixed in the same way as described in Example 3 to coat the magnetic particles with the titanium coupling agent. Using the coated powder, a composition of

| | |
| --- | --- |
| Cobalt-deposited, acicular coated α-Fe$_2$O$_3$ | 120 parts by weight |
| Carbon black (for antistatic use, "Mitsubishi Carbon Black MA-600") | 5 parts by weight |
| α-Al$_2$O$_3$ powder (particle size 0.5μ) | 2 parts by weight |
| Solvent (methyl ethyl ketone/toluene 50/50) | 100 parts by weight | was mixed for thorough dispersion by a ball mill for 3 hours.

Next, a binder mixture consisting of

| | |
| --- | --- |
| Acrylic double-bond-introduced, saturated polyester resin (c) | 10 weight parts (on solids basis) |
| Acrylic double-bond-introduced vinyl chloride-vinyl acetate copolymer (a) | 10 weight parts (on solids basis) |
| Acrylic double-bond-introduced polyether urethane elastomer (f) | 10 weight parts (on solids basis) |
| Solvent (methyl ethyl ketone/toluene 50/50) | 200 weight parts (on solids basis) |
| Lubricant (higher fatty acid-modified silicone oil) | 3 weight parts (on solids basis) | was mixed well and dissolved. The resultant was placed into the ball mill that had already treated the magnetic powder, and the two were again mixed and dispersed for 42 hours.

The magnetic coating material thus obtained was applied to a 15μ-thick polyester film, magnetically oriented on a (1600-gauss) permanent magnet, and the solvent was dried away by an infrared lamp or hot air. The coating surface was smoothened and the film was hardened by irradiation with radiant rays in an N$_2$ atmosphere by ESI's "Electro-curtain" type radiation accelerator at an acceleration voltage of 150 keV with an electric current of 20 mA to a total dosage of 10 mrads.

The tape thus formed was slitted into a ribbon ½-in. wide as a video tape (Specimen 8).

The cross-linking of this magnetic film is understood to have resulted from the combination of cross-linking by radicalization of the acrylic double bonds and cross-linking by the radicals formed in the molecular chains of vinyl chloride and vinyl acetate (possibly due to HCl removal but yet to be clarified).

Figure 4:
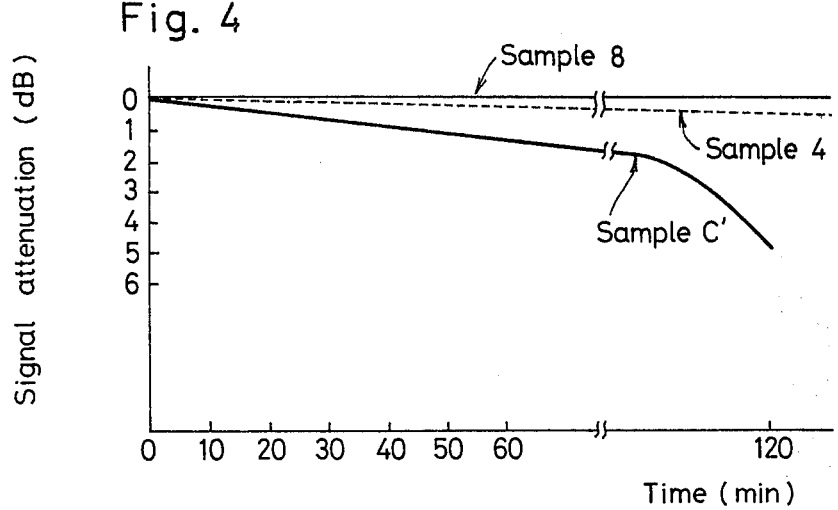
FIG. 4 is a graph showing rates of signal attenuation with time.

FIG. 4 is a graph showing the rates of attenuation (on still reproduction) of signals with respect to the reproduction output, as measured by recording signals on the video tape specimen and comparative specimens by a video tape recorder (Matsushita Electric's "NV-3120") for open reels conforming to the EIAJ unified standards and then by reproducing the still images with a tension of 200 grams applied on the take-up side by a spring balancer.

As can be seen from the graph, the cross-linking of the binder by irradiation gives a coating film of a tough structure and markedly reduces the rate of signal attenuation, regardless of the rigorous abrasive condition with a relative velocity of the magnetic film and the head as high as 11 meters a second.

Figure 5:
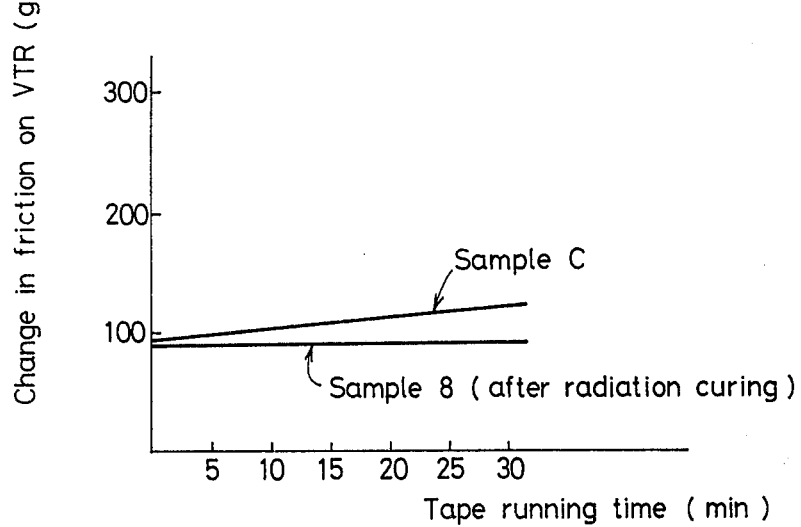
FIG. 5 is a graph showing changes in friction on a video tape recorder with the tape running time.

FIG. 5 is a graphic representation of changes in friction of the test video tape and a comparative specimen with running time. Each tape was held for five days under changing conditions in five cycles, each beginning with a temperature of −10° C. and a relative humidity of 0% and ending with 60° C. and 80%. After this period, the specimen was kept still at room temperature for 24 hours. The tape was then put on the same video tape recorder as used for the still reproduction test, a tension analyzer marketed by Japan Automatic Control Co., Model 1VA-500, was set between the head drum and the pinch roller of the recorder, and the changes in tension on the take-up side of the test tape with running time were measured.

This test permits evaluation of not only the friction coefficient level of the magnetic film itself of each test tape but also the degree of deterioration of tape running quality due to exudation of the low-molecular-weight components from the magnetic film, and stability of the tape against the environmental conditions such as temperature and humidity.

As will be understood from these graphs, the radiation cross-linked tapes have low friction coefficients. The low-molecular-weight elastomer component of the coating composition is thoroughly cross-linked and will not exude to the tape surface. The tapes run stably despite changes in temperature and humidity. Moreover, the tape (Specimen 8) of Example 8 had a greater inter-film strength than the tape (Specimen 4) of Example 4 where the titanium coupling agent was not applied but merely added to the magnetic powder. Test results indicative of this are given in Table 7. The table also carries the test results of the tape of Comparative Example 3 which used a silane coupling agent. The latter specimen is designated C' because it came from a different production batch in the comparative example.

TABLE 7

| Specimen | Surface quality[1] | Electromagnetic convern. charac.[2] | | No. of dropouts per min.[3] | Bond. str.[4] (g) |
|---|---|---|---|---|---|
| | | 4 MHz | Y S/N | | |
| 8 | 14.0 | +0.7 | +2.5 | 0.1 | 100 |
| C' | 8.0 | −10 | −7.0 | 5 | 20 |
| 4 | 12.0 | 0 | 0 | 0.3 | 80 |

Remarks:
[1]The surface gloss value as measured on the basis of a reference glass plate which is set at zero decibel (dB).
[2]Determined with Matsushita Electric's video tape recorder, Model National Maclord 6600.
[3]Determined with Matsushita Electric's video tape recorder, Model National Maclord 6600.
[4]Bonding strength as measured by a test for stripping the coating away from the base under tension.

EXAMPLE 9

| Acicular magnetic particles of Fe alloy (major axis 0.3μ, minor axis 0.04μ, Hc 1100 Oe) | 120 parts by weight |
|---|---|
| Titanium coupling agent (Kenrich's "KR-55") | 0.6 parts by weight |
| Water | 500 parts by weight |

In the same manner as described in Example 3, these components were mixed, heated, and dried, so that the magnetic particles were coated with the titanium coupling agent.

For use with the coated magnetic particles, a mixture consisting of

| Acrylic double-bond-introduced butyral resin (b) | 18 weight parts (on solids basis) |
|---|---|
| Acrylic double-bond-introduced urethane elastomer (e) | 12 weight parts (on solids basis) |
| Solvent (methyl ethyl ketone/toluene 50/50) | 200 weight parts (on solids basis) |
| Lubricant (higher fatty acid) | 3 weight parts (on solids basis) | was mixed well and dissolved.

The resultant was thoroughly mixed with the pretreated magnetic particles by a high speed mixer for 70 minutes, and the mixture was further mixed and dispersed by a sand grinding mill for 4 hours.

The magnetic coating material thus prepared was applied to a 12μ-thick polyester film. After magnetic field orientation, solvent drying, and surface smoothening, the coated film was exposed to radiation in an $N_2$ gas atmosphere in an "Electro-curtain" type radiation accelerator at an acceleration voltage of 150 keV with an electrode current of 10 mA to a total dosage of 5 mrads.

The tape so obtained was slitted into a ribbon 3.8 mm wide as an alloy audio cassette tape (Specimen 9).

The tape was compared with the tape (Specimen 5) of Example 5 in which the titanium coupling agent was simply added to the coating composition, and the results as shown in Table 8 were obtained.

TABLE 8

| Specimen | Surface quality[1] | Electromag. Conv. Charac.[2] | | | Tape squeal[3] (hr) | Recipro. run durability (No. of pass | Deposit on head[5] |
|---|---|---|---|---|---|---|---|
| | | MoL 333 Hz | MoL 3 KHz | MoL 16 KHz | | | |
| 9 | 14.0 | +4.0 | +7.0 | +12.5 | 30 | >200 | 4 |
| 5 | 12.5 | +3.5 | +6.5 | +12.0 | 30 | >200 | 3 |

Remarks:
[1]The surface gloss value as measured on the basis of a reference glass plate which is set at zero decibel (dB).
[2]Determined by means of Nakamichi Research Institute's cassette deck, Model Nakamichi 582 in the metal position.
[3]Determined by means of Nakamichi Research Institute's cassette deck, Model Nakamichi 582 in the metal position.
[4]Determined by means of Nakamichi Research Institute's cassette deck, Model Nakamichi 582 in the metal position.
[5]Determined by means of Nakamichi Research Institute's cassette deck, Model Nakamichi 582 in the metal position.

As will be apparent from Table 8, the radiation-sensitive elastomer component used in Example 9 can be of a low molecular weight because of its subjection to radiation cross-linking. Hence it is affinitive for the magnetic alloy particles and imparts the magnetic coating material with an excellent surface-forming property after application, allowing the tape to have a very smooth surface and a high residual magnetic flux density.

Thus, a tape of every high sensitivity over the MoL ranges from the low frequency of 333 Hz to the high frequency of 16 KHz was obtained. Furthermore, because the surface quality was excellent and the electromagnetic conversion characteristics and inter-film strength were improved, the amount of deposit on the head of the video tape recorder decreased.

EXAMPLE 10

| $\gamma$-$Fe_2O_3$ (major axis 0.8μ, minor axis 0.2μ, Hc 300 Oe) | 120 parts by weight |
|---|---|
| Titanium coupling agent (Kenrich's "KR-55") | 3.6 parts by weight |
| Solvent (methyl ethyl ketone/toluene 50/50) | 500 parts by weight |

These components were mixed, heated, and dried, so that the magnetic particles were coated with the titanium coupling agent.

Next,

| Acrylic double-bond-introduced epoxy resin (d) | 15 parts by weight |
|---|---|
| Acrylic double-bond-introduced polybutadiene elastomer (g) | 15 parts by weight |

-continued

| Solvent (methyl ethyl ketone/toluene 50/50) | 200 parts by weight |
| Lubricant (fluorine oil, E.I. du Pont de Nemours "Kritox") | 3 parts by weight | were mixed well and dissolved to obtain a mixture.

The mixture was placed into a ball mill together with

| Titanium coupling agent-coated $\alpha\alpha$-$Fe_2O_3$ | 120 parts by weight |
| Carbon black (for antistatic use, "Mitsubishi Carbon Black MA-600") | 5 parts by weight |
| $\alpha$-$Al_2O_3$ (particle size 0.5$\mu$) | 2 parts by weight |
| Solvent (methyl ethyl ketone/toluene 50/50) | 100 parts by weight | and the whole mixture was again mixed and dispersed for 42 hours.

The magnetic coating material thus prepared was applied to one side of a 188$\mu$-thick polyester film to form a coating film about 10$\mu$ thick, and the coating was dried, and then the coated surface was smoothened. The coating film was hardened by irradiation in an $N_2$ gas atmosphere by an "Electro-curtain" type radiation accelerator at an acceleration voltage of 175 keV with an electrode current of 15 mA to a total dosage of 2 mrads.

A disk (about 65 mm in diameter) was blanked out of the resulting roll, and a magnetic disk (Specimen 10) was obtained.

EXAMPLE 11

| $\gamma$-$Fe_2O_3$ (major axis 0.8$\mu$, minor axis 0.2$\mu$, Hc 300 Oe) | 120 parts by weight |
| Titanium coupling agent (Kenrich's "KR-7"). | 6 parts by weight |
| Solvent (methyl ethyl ketone/toluene 50/50) | 100 parts by weight |

These components were mixed, heated, and dried. The magnetic particles were coated with the titanium coupling agent. Next, a mixture of

| Allyl-group-introduced methacrylic resin | 15 weight parts (on solids basis) |
| Internally-plasticized, unsaturated polyester resin | 15 weight parts (on solids basis) |
| Solvent (methyl ethyl ketone/toluene 50/50) | 200 weight parts (on solids basis) |
| Lubricant (fatty acid-modified) siloxane | 3 weight parts (on solids basis) | were mixed well and dissolved.

The resultant was thoroughly mixed for dissolution with a mixture consisting of:

| Titanium coupling agent-coated $\gamma Fe_2O_3$ | 120 parts by weight |
| Carbon black (for antistatic use, "Mitsubishi Carbon Black MA-600") | 5 parts by weight |
| $\alpha$-$Al_2O_3$ (particle size 0.5$\mu$) | 2 parts by weight |
| Solvent (methyl ethyl ketone/toluene 50/50) | 100 parts by weight |

The resultant was placed into the ball mill where the magnetic powder had been treated in advance, and again mixing and dispersion were effected for 42 hours.

The magnetic coating material thus prepared was applied to one side of a 188$\mu$-thick polyester film to form a coating film about 10$\mu$ thick, and the coating was dried, and then the coated surface was smoothened. The coating film was hardened by irradiation in a $CO_2$ gas atmosphere by an "Electro-curtain" type radiation accelerator at an acceleration voltage of 175 keV with an electrode current of 15 mA to a total dosage of 2 mrads.

A disk (about 65 mm in diameter) was blanked out of the resulting roll, and a magnetic disk (Specimen 11) was obtained.

In order to find out the effects of varied treating conditions upon the properties of magnetic coating layers, magnetic disks (Specimens 6' and 7') were made by the same procedures as described in Example 6 (with the exception that the 3.6 parts of the titanium coupling agent, Kenrich's "KR-11", was replaced by 3 parts of Kenrich's "KR-55") and in Example 7 (with the exception that the 6 parts by weight of the titanium coupling agent, Kenrich's "KR-39CS", was replaced by 3 parts of Kenrich's "KR-7"). These comparative specimens and the magnetic disks of the foregoing examples (Specimens 10 and 11) were tested for their performances. Each test disk was set on a recorder-reproducer and was driven to run at a speed of about one meter per second in sliding contact with the magnetic head (at a pad pressure of 40 g/cm$^2$), and the time required for the dropouts to reach a cumulative number of 1000 was measured.

The results of time measurements and the surface conditions at the ends of the periods are summarized in Table 9.

TABLE 9

| Specimen | Running time | Surface condition | Deposit on head |
|---|---|---|---|
| 10 | >50 min. | Good | 4.5 |
| 6' | >50 min. | Good | 4 |
| 11 | >50 min. | Good | 4.5 |
| 7' | >50 min. | Good | 4 |

As is manifest from the table, Specimens 10 and 11 formed less deposits on the head than Specimens 6' and 7' did, proving that the former two had superior coating films.

What we claim is:

1. A magnetic recording medium comprising a substrate and a magnetic recording layer formed thereon, characterized in that said magnetic recording layer is made of a magnetic coating material consisting essentially of a magnetic powder dispersed in a binder, said magnetic coating material containing a titanium coupling agent.

2. A magnetic coating medium according to claim 1, wherein said magnetic powder has a surface coating of said titanium coupling agent.

3. A magnetic recording medium according to claim 1, wherein said magnetic powder is mixed with said titanium coupling agent and then dispersed in said binder.

4. A magnetic recording medium according to claim 1, 2 or 3, wherein said binder is one prepared by mixing and plasticizing a radiation-sensitive modified resin, which has radiation-sensitive, unsaturated bonds, such as acrylic, maleic, or allylic double bonds, and adapted to be cross-linked and polymerized by exposure to radiation, with a radiation-sensitive soft resin, which also has said double bonds, or a prepolymer, oligomer, or telomer thereof (with a dynamic modulus of less than $1 \times 10^9$ dyn/cm$^2$ at 20° C.) and then by subjecting the mixture to radiation cross-linking and polymerization.

5. A magnetic recording medium according to any of claims 1 to 4, wherein said magnetic powder is in the form of acicular particles of a cobalt-modified magnetic iron oxide and/or particles of a magnetic alloy.

6. A magnetic recording medium according to claim 4 or 5, wherein said cross-linking and polymerization by irradiation are carried out in an inert gas stream.

7. A process for producing a magnetic recording medium which comprises the steps of coating magnetic particles with a titanium coupling agent, blending the coated magnetic particles with a binder to obtain a magnetic coating material, and then applying the coating material to a substrate.

8. A process according to claim 7, which further comprises the step of drying the coated surfaces, after the coating of said magnetic particles with said coupling agent and before blending said coated particles with said binder resin.

9. A process for producing a magnetic recording medium which comprises the steps of mixing a titanium coupling agent with magnetic particles, blending the magnetic particles so mixed with said coupling agent with a binder to obtain a magnetic coating material, and then applying the coating material to a substrate.

10. A process according to claim 7, 8, or 9, wherein said titanium coupling agent is used in an amount of 0.5–7 weight percent based on the weight of said magnetic particles.

11. A process according to claim 7, 8 or 9, wherein said titanium coupling agent is used in an amount of 0.5–3 weight percent based on the weight of said magnetic particles.

* * * * *